Jan. 24, 1956      B. B. LEVITT      2,731,811

VORTEX TYPE AIR COOLER

Filed July 1, 1952

*INVENTOR.*
BEN BERNARD LEVITT
*BY*

ATTORNEY

United States Patent Office 2,731,811
Patented Jan. 24, 1956

2,731,811

VORTEX TYPE AIR COOLER

Ben Bernard Levitt, Brunswick, Ga.

Application July 1, 1952, Serial No. 296,620

12 Claims. (Cl. 62—136)

My invention relates to an air cooler for aircraft or other vehicles and the like, and more particularly to an air cooler utilizing ram air to produce a cooling effect on the air to thereby lower the temperature of the air.

In the past, air coolers for vehicles have utilized conventional refrigerating equipment which consists of a compressor, condensing and evaporating coils, several valves, considerable tubing and a refrigerating medium such as dichlorodifluoromethane, ammonia or the like, to cool the air. While such equipment successfully cools the air, it may be seen that the equipment necessary to cool air in this manner is very cumbersome and bulky for use in vehicles such as aircraft, trucks and other portable installations, as well as involving considerable initial expense and introducing numerous maintenance problems that accompany a sealed refrigerating system. Another method of cooling air utilized in the past has been to pass the air to be cooled over water or through water saturated cloth or excelsior to make use of the principle whereby heat absorbed by the evaporating water cools the air. While this method cools the air to some degree, it also raises the relative humidity of the cooled air, making it undesirable in most cases; and, in using this method, it is necessary to maintain the water supply and in many cases to circulate the water over the cloth or excelsior, thereby introducing additional equipment with the corresponding increase in expense and maintenance problems. In the majority of the aforementioned prior art methods of cooling air, some means of driving the mechanical portions of the cooling devices must be provided. This is customarily accomplished by utilizing power from the prime mover, thereby decreasing the amount of power available for the primary purpose of the prime mover in driving the vehicle.

It is therefore an object of my invention to provide a means and a method for utilizing ram air to produce a cooling effect on the air.

Another object of my invention is to provide a simple means by which air may be cooled without the use of moving parts or sealed refrigerating system.

Still another object of my invention is to provide a means of inducing vortex motion to ram air and utilizing the fact that a cold area is developed in the vicinity of the vortex to obtain the desired cooling effect on the air.

A further object of my invention is to provide a means for cooling air that is adaptable for use in vehicles, especially high speed aircraft where interior temperature control is a necessity.

A still further object of my invention is to provide a device which does not require any power to operate it other than the power required to move the device through the air.

Another object of my invention is to provide a device that is light, compact and easily installed, and which is inexpensive to manufacture and will require very little if any maintenance.

Other and further objects and advantages of my invention will become apparent from the following description of my invention when taken in conjunction with the accompanying drawings in which like characters of reference designate corresponding parts throughout the several views, and wherein.

Figure 1:
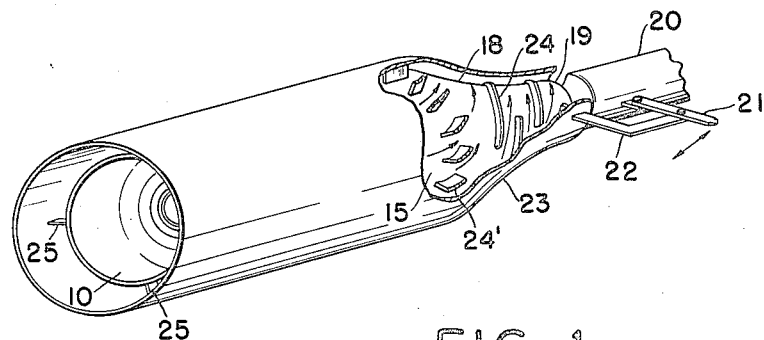
Fig. 1 is a partially broken isometric view of an air cooler embodying my invention.
Figure 2:
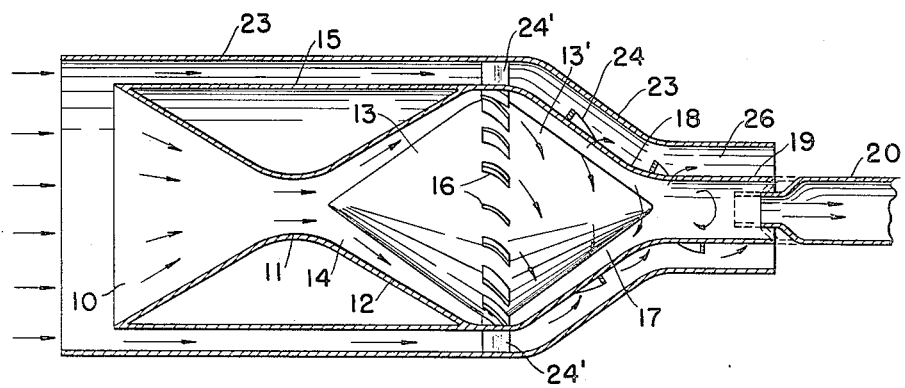
Fig. 2 is a cross-sectional view of the embodiment shown in Fig. 1.

Referring now in detail to the embodiment chosen for purpose of illustration, the numeral 10 denotes generally the converging conical nozzle which directs the flow of air through throat 11 and into diverging section 12 in which is placed an accelerating cone 13, the taper of which is such that the annular area 14 is continually decreasing even though the diameter of the divergent section 12 is increasing. Attached to the outer periphery at the maximum diameter of accelerating cone 13, and also attached to the cylindrical shell 15, are a plurality of identical, equally spaced, deflecting vanes 16 which impart vortical motion to the flow of air in the converging annular channel 17 in which the effective area is continually decreasing due to the taper of the convergence cone 13' and the converging section 18, on the outer periphery of which are mounted a plurality of deflecting vanes 24. Between shell 15 and outer housing 23, on the same transverse plane with vanes 16, are mounted a plurality of equally spaced deflecting vanes 24' which are similar to vanes 16. The section 18 converges into cylindrical exhaust tube 19 which is fitted at the discharge end with a variable orifice tube 20 which when in the forward position shown by the broken lines in Fig. 2 completely seals the exit opening in tube 19, except for passage of air through the orifice tube 20. Movement of the variable orifice tube 20 is controlled manually by means of lever 21 connected thereto and pivotally mounted to arm 22 which is permanently affixed to outer housing 23 which conforms generally to the combined shape of cylindrical tube 19, converging section 18, and cylindrical shell 15, as shown in Fig. 2. Outer housing 23 is mounted in such a manner that a definite space is provided between the inner wall of housing 23 and the outer walls of tube 19, section 18, and shell 15. This spacing is held constant by means of a plurality of lugs 25 which are connected to and maintain equal spacing between housing 23 and shell 15.

The principle of operation of my device is based on the fact that an air flow, in which a vortex is induced, will develop a cold area in the vicinity of the vortex center, while the outside of the vortex will develop a higher temperature. With the above mentioned principle in mind and assuming that the device is properly mounted on a vehicle, preferably an aircraft for illustrative purposes, my air cooler operates in the following manner; ram air enters the device as shown by arrows in Fig. 2, and the major portion of the air enters the converging nozzle 10 in which it is continuously accelerated toward the throat 11 where it is directed into the annular area 14 where the velocity of the air is continually increased due to the difference in the taper of the diverging section 12 and the cone 13 which causes a reduction in area 14.

When the air flow reaches the outer periphery of the accelerating cone 13, it is directed by means of vanes 16 in such a manner as to induce vortical motion. The angle through which the air flow must be turned to impart the desired circular motion was found to be between 65 degrees and 85 degrees. After the air flow passes through vanes 16, it spirals down the convergence cone 13' in area 17 which is continually decreasing due to the difference in the taper of cone 13' and section 18, thereby causing the velocity of the air flow to continually and rapidly increase until the tip of the cone 13' is reached, at which point the vortex is completely developed and is directed into the cylindrical discharge tube 19 where the cooled air is bled off from the center of the vortex by means of the variable orifice tube 20, which is normally connected directly to the interior cooling ducts of the vehicle.

By adjustment of the variable orifice, the desired amount and degree of cooling air can be introduced into the cooling ducts of the vehicle. The adjustment is obtained by simply moving lever 21 forward to cause the orifice tube to be withdrawn from the tube 19 for minimum cooling, or by moving lever 21 backward to cause the orifice tube to be moved forward into the tube 19 for maximum cooling. It may be seen that intermediate positions of the orifice tube 20 will give various degrees of cooling. It is also to be noted that when the orifice tube 20 is in the full forward position it seals off completely the exhaust end of tube 19 except for the exhaust of air through the orifice tube 20, and other positions of the orifice tube 20 vary the percentage of air from exhaust tube 19 which is bled off through orifice tube 20.

It will be noted at this time that all of the ram air entering the device does not pass into the nozzle 10. A portion of the incoming ram air is allowed to flow between shell 15 and the outer housing 23. When this air flow reaches the converging section of the outer housing 23, it is continually accelerated due to the decreasing area between the converging section of housing 23 and the section 18. The direction of flow is also changed in this area by means of a plurality of deflecting vanes 24, 24' which are arranged symmetrically around the outer periphery of shell 15 and the converging section 18 in such manner as to induce vortical motion and thereby create a vortex in the air flow as it proceeds through the converging section of the housing 23 and out of area 26. The vanes 24 are installed in a manner to give rotation in the direction opposite to that of the air flow in area 17, thereby producing contra-rotating vortices and balancing the system dynamically. This contra-rotating vortical flow in area 26 has a cooling effect on the surfaces 18 and 19 which are also in contact with the relatively warmer portion of the vortical flow in area 17 thereby cooling still further the air used in cooling the vehicle, as well as serving to reduce the pressure at the exhaust end of tube 19 and thereby facilitating the flow of air through the devices. In this connection, it will be noted that the walls 15, 18 and 19 are made of thin, heat conducting material, and the vanes 24 also serve as cooling fins in transferring heat outwardly from the inner vortex in area 17 and dissipating it into the outer vortex.

While the foregoing description has dealt primarily with the use of ram air, it is to be remembered that the device is not restricted to ram air, but can use other gas and is readily adaptable to a power driven means such as either a blower fan at the front of the device or a suction fan at the rear of the device to be driven by any conventional power medium.

My device is readily adaptable for use in supersonic aircraft by design of the entrance to provide for a shock wave, or a series of shock waves, to reduce the ram air to sub-sonic speeds prior to its entry into the cooler.

It will be obvious to those skilled in the art that various changes may be made in the embodiment chosen for purpose of illustration without departing from the scope of my invention as defined in the appended claims.

I claim:

1. An air cooler comprising wall means defining an annular converging channel for the passage of air therethrough, deflecting means within said channel for imparting vortical motion to air passing through said channel to create a vortex of air in said channel, and orifice means adjacent the outlet end of said channel for bleeding off the center of said vortex of air emerging from said channel.

2. An air cooler comprising wall means defining an annular converging channel of decreasing area for the passage of air therethrough, deflecting means within said channel for imparting vortical motion to air passing through said channel to create an inner vortex of air in said channel, orifice means mounted adjacent the outlet end of said channel for bleeding off air emerging from said channel, and means outside said inner wall means to impart vortical movement to air passing over the outside said wall means to create an outer vortex rotating in the direction opposite the direction of rotation of said inner vortex.

3. An air cooler comprising wall means defining an annular converging channel of decreasing area for the passage of air therethrough, deflecting means within said channel for imparting vortical motion to air passing through said channel to create an inner vortex of air in said channel, orifice means adjustably mounted adjacent the outlet end of said channel for selectively bleeding off air emerging from said channel, and means outside said wall means to impart vortical movement to air passing over the outside of said wall means to create an outer vortex rotating in the direction opposite the direction of rotation of said inner vortex.

4. An air cooler comprising inner wall means defining an annular converging channel of decreasing area for the passage of air therethrough, deflecting means within said channel for imparting vortical motion to air passing through said channel to create an inner vortex of air in said channel, orifice means adjustably mounted adjacent the outlet end of said channel for selectively bleeding off the center of said vortex of air emerging from said channel, and outer wall means surrounding said inner wall means and spaced therefrom to form an outer channel for the passage of air between said outer wall means and said inner wall means, air in said outer channel being in heat exchange relation with said inner wall means.

5. An air cooler comprising inner wall means defining an annular converging channel for the passage of air therethrough, deflecting means within said channel for imparting vortical motion to air passing through said channel to create an inner vortex of air in said channel, orifice means adjacent the outlet end of said channel for bleeding off air emerging from said channel, and means outside said inner wall means and spaced therefrom to form an outer channel for the passage of air between said outer wall means and said inner wall means, air in said outer channel being in heat exchange relation with said inner wall means, deflecting means in said outer channel constructed to impart vortical movement to air passing therethrough to create an outer vortex rotating in the direction opposite the direction of rotation of said inner vortex.

6. An air cooler comprising inner wall means defining an annular converging channel of decreasing area for the passage of air therethrough, deflecting means within said channel for imparting vortical motion to air passing through said channel to create an inner vortex of air in said channel, orifice means adjustably mounted adjacent the outlet end of said channel for selectively bleeding off air emerging from said channel, outer wall means surrounding said inner wall means and spaced therefrom to form an outer channel for the passage of air between said outer wall means and said inner wall means, air in said outer channel being in heat exchange relation with said inner wall means, and deflecting means in said outer channel constructed to impart vortical movement to air passing therethrough to create an outer vortex rotating in the direction opposite the direction of rotation of said inner vortex.

7. An air cooler comprising wall means defining a converging cone-shaped air intake, said wall means converging to form a throat and then diverging beyond said throat, an accelerating cone positioned within said diverging wall means to form therewith an annular diverging channel which decreases in area while increasing in diameter, said wall means extending beyond the maximum diameter of said accelerating cone and then converging into an exhaust tube, said accelerating cone tapering beyond said maximum diameter into a point adjacent the entrance into said exhaust tube and cooperating with said wall means to form an annular converging channel of decreasing area, a deflecting vane between said accelerating cone and said wall means to impart vortical motion to air passing through said air intake to said exhaust tube to create a vortex of air in said annular converging channel, and orifice means adjacent the outlet end of said exhaust tube for bleeding off air emerging from said exhaust tube.

8. An air cooler comprising wall means defining a converging cone-shaped air intake, said wall means converging to form a throat and then diverging beyond said throat, an accelerating cone positioned within said diverging wall means to form therewith an annular diverging channel which decreases in area while increasing in diameter, said wall means extending beyond the maximum diameter of said accelerating cone and then converging into an exhaust tube, said accelerating cone tapering beyond said maximum diameter into a point adjacent the entrance into said exhaust tube and cooperating with said wall means to form an annular converging channel of decreasing area, a deflecting vane between said accelerating cone and said wall means to impart vortical motion to air passing through said air intake to said exhaust tube to create a vortex of air in said annular converging channel, and orifice means adjustably mounted adjacent the outlet end of said exhaust tube for selectively bleeding off air emerging from said exhaust tube.

9. An air cooler comprising wall means defining a converging cone-shaped air intake, said wall means converging to form a throat and then diverging beyond said throat, an accelerating cone positioned within said diverging wall means to form therewith an annular diverging channel which decreases in area while increasing in diameter, said wall means extending beyond the maximum diameter of said accelerating cone and then converging into an exhaust tube, said accelerating cone tapering beyond said maximum diameter into a point adjacent the entrance into said exhaust tube and cooperating with said wall means to form an annular converging channel of decreasing area, a deflecting vane between said accelerating cone and said wall means to impart vortical motion to air passing though said air intake to said exhaust tube to create an inner vortex of air in said annular converging channel, orifice means adjustably mounted adjacent the outlet end of said exhaust tube for selectively bleeding off air emerging from said exhaust tube, and means surrounding said wall means to impart vortical movement to air passing over the outside of said wall means to create an outer vortex rotating in the direction opposite the direction of rotation of said inner vortex.

10. An air cooler comprising inner wall means defining a converging cone-shaped air intake, said inner wall means converging to form a throat and then diverging beyond said throat, an accelerating cone positioned within said diverging inner wall means to form therewith an annular diverging channel which decreases in area while increasing in diameter, said inner wall means extending beyond the maximum diameter of said accelerating cone and then converging into an exhaust tube, said accelerating cone tapering beyond said maximum diameter into a point adjacent the entrance into said exhaust tube and cooperating with said inner wall means to form an annular converging channel of decreasing area, a deflecting vane between said accelerating cone and said inner wall means to impart vortical motion to air passing through said air intake to said exhaust tube to create an inner vortex of air in said annular converging channel, orifice means adjustably mounted adjacent the outlet end of said exhaust tube for selectively bleeding off air emerging from said exhaust tube, and outer wall means surrounding said inner wall means and spaced therefrom to form an outer channel for the passage of air between said outer wall means and said inner wall means, air in said outer channel being in heat exchange relation with said inner wall means.

11. An air cooler comprising inner wall means defining a converging cone-shaped air intake, said inner wall means converging to form a throat and then diverging beyond said throat, an accelerating cone positioned within said diverging inner wall means to form therewith an annular diverging channel which decreases in area while increasing in diameter, said inner wall means extending beyond the maximum diameter of said accelerating cone and then converging into an exhaust tube, said accelerating cone tapering beyond said maximum diameter into a point adjacent the entrance into said exhaust tube and cooperating with said inner wall means to form an annular converging channel of decreasing area, a deflecting vane between said accelerating cone and said inner wall means to impart vortical motion to air passing through said air intake to said exhaust tube to create an inner vortex of air in said annular converging channel, orifice means adjacent the outlet end of said exhaust tube for bleeding off air emerging from said exhaust tube, outer wall means surrounding said inner wall means and spaced therefrom to form an outer channel for the passage of air between said outer wall means and said inner wall means, air in said outer channel being in heat exchange relation with said inner wall means, and a deflecting vane in said outer channel constructed to impart vortical movement to air passing therethrough to create an outer vortex rotating in the direction opposite the direction of rotation of said inner vortex.

12. An air cooler comprising inner wall means defining a converging cone-shaped air intake, said inner wall means converging to form a throat and then diverging beyond said throat, an accelerating cone positioned within said diverging inner wall means to form therewith an annular diverging channel which decreases in area while increasing in diameter, said inner wall means extending beyond the maximum diameter of said accelerating cone and then converging into an exhaust tube, said accelerating cone tapering beyond said maximum diameter into a point adjacent the entrance into said exhaust tube and cooperating with said inner wall means to form an annular converging channel of decreasing area, a plurality of deflecting vanes between said accelerating cone and said inner wall means to impart vortical motion to air passing through said air intake to said exhaust tube to create an inner vortex of air in said annular converging channel, orifice means adjustably mounted adjacent the outlet end of said exhaust tube for selectively bleeding off air emerging from said exhaust tube, outer wall means surrounding said inner wall means and spaced therefrom to form an outer channel for the passage of air between said outer wall means and said inner wall means, air in said outer channel being in heat exchange relation with said inner wall means, and a plurality of deflecting vanes in said outer channel constructed to impart vortical movement to air passing therethrough to create an outer vortex rotating in the direction opposite the direction of rotation of said inner vortex.

References Cited in the file of this patent

UNITED STATES PATENTS

| | | |
|---|---|---|
| 1,812,339 | Horne | June 30, 1931 |
| 1,952,281 | Ranque | Mar. 27, 1934 |
| 2,097,104 | Saha | Oct. 26, 1937 |
| 2,581,168 | Bramley | Jan. 1, 1952 |
| 2,586,002 | Carson | Feb. 19, 1952 |